(12) United States Patent
Bonanno et al.

(10) Patent No.: US 9,970,565 B2
(45) Date of Patent: May 15, 2018

(54) SOLENOID VALVE PISTON SEAL

(71) Applicant: Continental Automotive GmbH, Hannover (DE)

(72) Inventors: Rosario Bonanno, Bad Soden (DE); Joachim Korn, Limburg an der Lahn (DE)

(73) Assignee: Continental Automotive GmbH, Hannover (DE)

( * ) Notice: Subject to any disclaimer, the term of this patent is extended or adjusted under 35 U.S.C. 154(b) by 50 days.

(21) Appl. No.: 15/028,918

(22) PCT Filed: Oct. 13, 2014

(86) PCT No.: PCT/EP2014/071902
§ 371 (c)(1),
(2) Date: Apr. 12, 2016

(87) PCT Pub. No.: WO2015/055587
PCT Pub. Date: Apr. 23, 2015

(65) Prior Publication Data
US 2016/0245424 A1    Aug. 25, 2016

(30) Foreign Application Priority Data

Oct. 14, 2013 (DE) ........................ 10 2013 200 685

(51) Int. Cl.
| | |
|---|---|
| F16K 31/06 | (2006.01) |
| F02B 37/16 | (2006.01) |
| F16K 27/02 | (2006.01) |
| F16K 1/36 | (2006.01) |
| F02B 33/00 | (2006.01) |
| F02B 39/16 | (2006.01) |

(52) U.S. Cl.
CPC .......... *F16K 31/0655* (2013.01); *F02B 33/00* (2013.01); *F02B 37/16* (2013.01); *F02B 39/16* (2013.01); *F16K 1/36* (2013.01); *F16K 27/029* (2013.01); *Y02T 10/144* (2013.01)

(58) Field of Classification Search
None
See application file for complete search history.

(56) References Cited

U.S. PATENT DOCUMENTS 8,387,383 B2    3/2013 Thiery et al.

FOREIGN PATENT DOCUMENTS

| CN | 201827493 U | 5/2011 |
|---|---|---|
| CN | 203009035 U | 6/2013 |
| DE | 10 2008 031 738 A1 | 1/2010 |
| DE | 10 2011 056 096 A1 | 6/2013 |
| DE | 10 2013 214 594 A1 | 1/2015 |
| JP | 2014-066304 | 4/2014 |
| WO | WO 2006/029814 A1 | 3/2006 |
| WO | WO 2007/048828 A1 | 5/2007 |
| WO | WO 2014/095403 A1 | 6/2014 |

*Primary Examiner* — Jessica Cahill
*Assistant Examiner* — Daphne M Barry
(74) *Attorney, Agent, or Firm* — Cozen O'Connor

(57) ABSTRACT

A valve includes: a housing having a housing stop; a solenoid arranged in the housing; a pin movable by the solenoid; a piston connected to the pin; a spring configured to provide prestressing of the piston; and a seal configured to seal the piston against the housing. The piston has a circumferential stop arranged on its outer face, the circumferential stop of the piston bearing against the housing stop such that the piston is movable, by the spring, beyond a closed position of the valve.

5 Claims, 1 Drawing Sheet

SOLENOID VALVE PISTON SEAL

CROSS-REFERENCE TO RELATED APPLICATIONS

This is a U.S. national stage of application No. PCT/EP2014/071902, filed on 13 Oct. 2014, which claims priority to the German Application No. 10 2013 220 685.2 filed 14 Oct. 2013, the content of both incorporated herein by reference.

BACKGROUND OF THE INVENTION

1. Field of the Invention

The invention relates to a valve of the type having a housing, a solenoid arranged in the housing, a pin movable by the solenoid, a piston connected to the pin, and a seal that seals the piston against the housing.

2. Related Art

Valves of this type are used, inter alia, as a diverting air valve on a turbocharger in motor vehicles, so as to open a bypass to the suction side in an overrun mode, as a result of which excessively abrupt braking of the turbocharger is prevented and rapid starting up is ensured. The opening and closing of the bypass takes place via the piston that acts as a closing member and opens or closes an opening in the bypass line. For closing purposes, the piston is moved into the closed position by a spring. For opening purposes, the piston is moved out of the closed position counter to the spring force by the solenoid. In order to seal the housing with respect to the bypass line, a seal that bears against the outer face of the piston is arranged in the housing. During opening and closing of the piston, the piston moves with respect to the seal. So that the piston is not pressed out of the housing by the spring during transport and before the installation on the bypass line, a flange is integrally formed at that end of the piston that faces the solenoid. The flange presses against the seal and thus prevents the release of the piston from the housing. It is disadvantageous that the seal can be damaged by the piston as a consequence of the transport movements. The possibility of such damage makes it necessary to perform additional tests in order to avoid failures of the valve during operation.

SUMMARY OF THE INVENTION

In view of the above, an object of the invention is to provide a valve, the seal of which is protected against damage as a consequence of transport movements after assembly has taken place and before installation.

This object is achieved, in accordance with an aspect of the present invention, by providing the piston with a circumferential stop on its outer face, the stop of the piston bearing against a stop of the housing, the piston having been moved beyond the closed position by the spring in this position.

According to an aspect of the present invention, a particularly simple and reliable fixing structure of the piston is provided with the configuration of a stop on the piston pressed against a housing-side stop by the spring, which is already arranged in the valve. By virtue of the this configuration, complicated securing measures are not necessary. Since the position of the fixing structure lies behind the position of the piston in the closed position, the piston cannot reach the position in the installed state on the turbocharger. This ensures that the operation of the valve is not impaired and the fixing structure acts exclusively in the phase in which the valve has not yet been installed as intended.

In one aspect, the stop is formed on the piston by forming a region of the piston with a greater external diameter. A stop of this type can be achieved with a small outlay of material-removing or reshaping.

In another aspect, in order to avoid excessively abrupt impact of the stops that might lead to damage, the transition of the piston into the region with a greater external diameter is configured as a cone.

A complicated design of the housing is avoided by virtue of the fact that the housing has at least one housing part arranged in the region of the piston and has a housing-side stop. As a consequence of the multiple-piece housing configuration, the manufacture of the individual housing parts is simplified considerably.

According to a further advantageous refinement, a contribution is made to simplifying the housing if the housing part is configured to receive and guide the seal.

BRIEF DESCRIPTION OF THE DRAWINGS

The invention will be described in greater detail using one exemplary embodiment. In the drawings.

DETAILED DESCRIPTION OF THE PRESENTLY PREFERRED EMBODIMENTS

Figure 1:
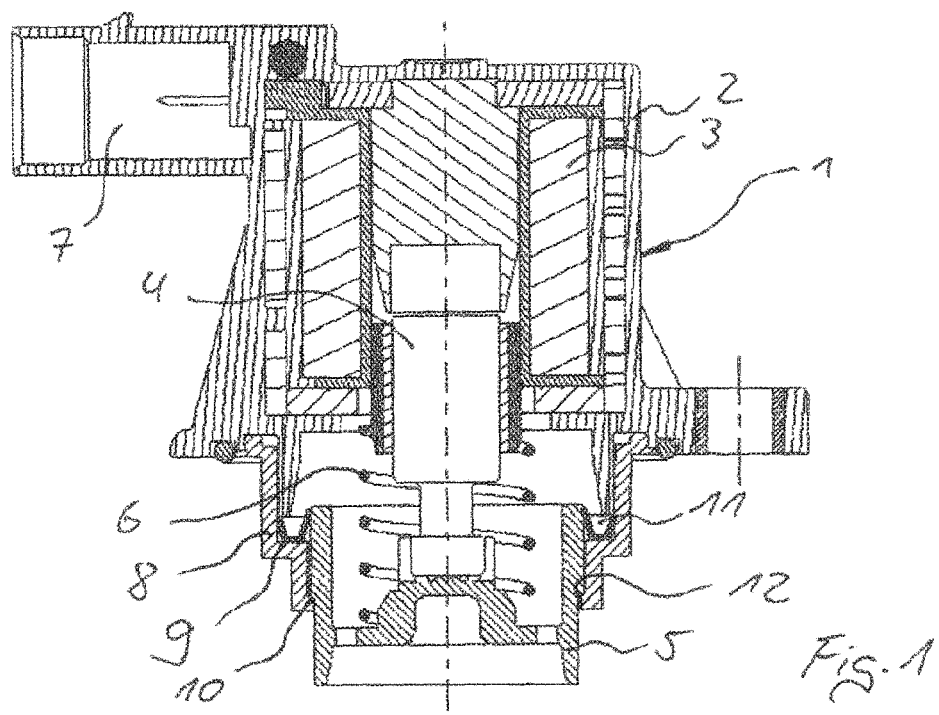
FIGS. 1 and 2 show a section through a valve according to the invention.

FIG. 1 shows a diverting air valve for a bypass line of a turbocharger of a motor vehicle. The valve has a two-part housing 1 with a first cup-shaped housing part 2, in which a solenoid with a coil 3 and a metal pin 4 are arranged. The metal pin 4 is connected to a piston 5 that acts as a closing member. A spring 6 ensures the necessary prestressing of the piston 5. In the illustration shown, the cup-shaped part 2 has a plug connector 7 on its upper side, which plug connector 7 is configured in one piece on the cup-shaped part 2. A second housing part 8, which extends as far as into the region of the piston 5, and surrounds the latter, is arranged in the edge region of the first cup-shaped housing part 2. The second housing part 8 is of a cylindrical configuration and has two radially circumferential shoulders 9, 10 on its inner wall. The shoulder 9 that lies closer to the first housing part 2 serves to support an annular seal 11, which seals the piston 5 against the second housing part 8. The second shoulder 10 of the housing part 8 acts as a stop and serves as a rest for a stop 12 which is configured on the outer face of the piston 5. The stop 12 is formed by a portion having a greater external diameter of the piston 5, the transition between the two external diameters of the piston 5 being configured as a cone. In the illustration shown, the piston 5 is moved out of the first housing part 2 by the spring 6. Further movement is blocked by the contact of the stop 12 on the shoulder 10. The piston is pressed against the shoulder 12 by the spring force, with the result that the piston is fixed in this position and the seal 11 is not subjected to any further loading as a consequence of a movement of the piston. In this position, the piston 5 is situated in the transport position.

Figure 2:
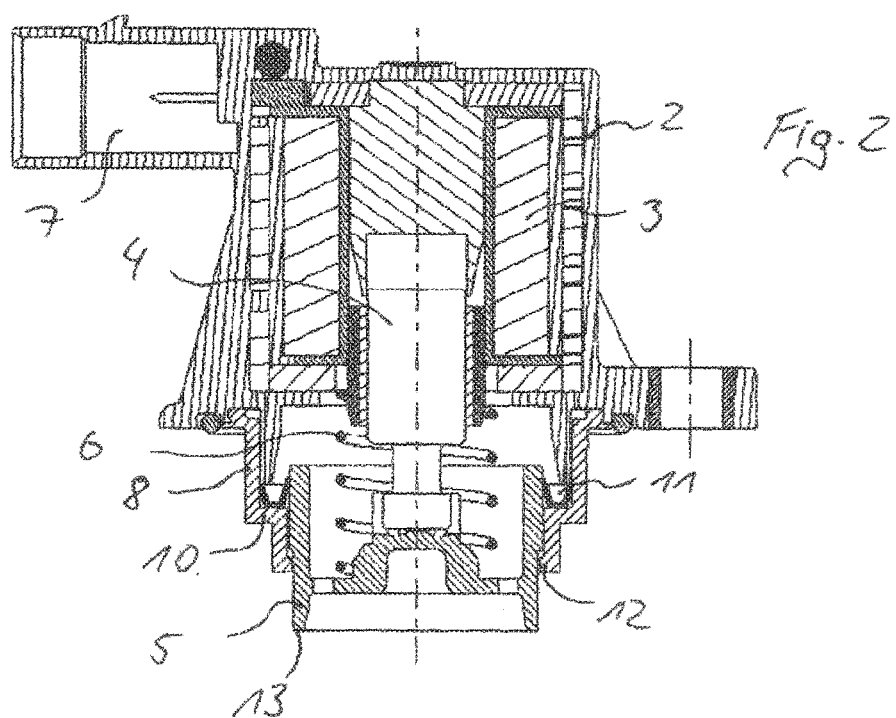

FIG. 2 shows the valve from FIG. 1 in the closed position and therefore in the installed state. The closed position means that the piston 5 bears with its side 13 which faces away from the metal pin 4 against the opening to be closed (not shown) of the bypass duct. The closed position is reached in turn by way of the spring 6. Since the position of the piston 5 in the closed position of the valve is closer to the first housing part 2 than in the transport position, the shoulder 10 and the stop 12 are spaced apart from one another and contact of the stop 12 with the shoulder 10 is ruled out.

Thus, while there have been shown and described and pointed out fundamental novel features of the invention as applied to a preferred embodiment thereof, it will be understood that various omissions and substitutions and changes in the form and details of the devices illustrated, and in their, operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve movable between a transport position and a closed position, the valve comprising:
   a housing (1) having:
      a first cup-shaped housing part (2), and
      a second housing part (8);
   a solenoid arranged in the first cup-shaped housing part (2) of the housing (1);
   a pin (4) arranged in the first cup-shaped housing part (2) of the housing (1), the pin (4) being movable by the solenoid;
   a piston (5) connected to the pin (4) and arranged within the second housing part (8);
   a spring (6) configured to provide prestressing of the piston (5); and
   a seal (11) configured to seal the piston (5) against the housing (1),
   wherein the second housing part (8) has a cylindrical configuration and has an inner wall, the second housing part (8) having a first radially circumferential shoulder (9) on the inner wall, and a second radially circumferential shoulder (10) on the inner wall, the first radially circumferential shoulder (9) being arranged closer, in comparison with the second radially circumferential shoulder (10), to the first cup-shaped housing part (2), and
   wherein the piston (5) has a circumferential stop (12) arranged on an outer face thereof, the circumferential stop (12) of the piston (5) being arranged, in the transport position of the valve, such that the circumferential stop (12) bears against the second radially circumferential shoulder (10), the piston (5) being movable, by the spring (6), from the transport position of the valve, in which the circumferential stop (12) bears against the second radially circumferential shoulder (10), to a closed position of the valve, in which the circumferential stop (12) does not contact the second radially circumferential shoulder (10).

2. The valve as claimed in claim 1, wherein the circumferential stop (12) comprises a region on the outer face of the piston (5) having a a first external diameter relatively larger than a second diameter of a region of the outer face of the piston (5) distal to the second housing part (8).

3. The valve as claimed in claim 2, the piston (5) further comprising a cone-shaped region that transitions between the first and second diameters.

4. The valve as claimed in claim 3, wherein the second housing part (8) is arranged proximate the piston (5).

5. The valve as claimed in claim 4, wherein the second housing part (8) is configured to receive and guide the seal (11).

* * * * *